(12) United States Patent
Galivel et al.

(10) Patent No.: US 8,979,705 B2
(45) Date of Patent: Mar. 17, 2015

(54) METHOD AND SYSTEM FOR CONTROLLING AIRCRAFT ENGINE STARTER/GENERATOR

(75) Inventors: Jean Pierre Galivel, Savigny le Temple (FR); Bruno Gaully, Marolles en Hurepoix (FR); Julien Ricordeau, Paris (FR)

(73) Assignee: Snecma, Paris (FR)

( * ) Notice: Subject to any disclaimer, the term of this patent is extended or adjusted under 35 U.S.C. 154(b) by 292 days.

(21) Appl. No.: 13/384,111

(22) PCT Filed: Jul. 7, 2010

(86) PCT No.: PCT/FR2010/051427
§ 371 (c)(1),
(2), (4) Date: Jan. 13, 2012

(87) PCT Pub. No.: WO2011/007078
PCT Pub. Date: Jan. 20, 2011

(65) Prior Publication Data
US 2012/0122631 A1 May 17, 2012

(30) Foreign Application Priority Data

Jul. 17, 2009 (FR) ..................................... 09 54983

(51) Int. Cl.
*H02P 17/00* (2006.01)
*F02C 7/36* (2006.01)
*F02C 7/268* (2006.01)
*F01D 15/10* (2006.01)
*F02C 7/275* (2006.01)
*F02C 7/32* (2006.01)

(52) U.S. Cl.
CPC ................ *F02C 7/268* (2013.01); *F01D 15/10* (2013.01); *F02C 7/275* (2013.01); *F02C 7/32* (2013.01); *F02C 7/36* (2013.01); *Y02T 50/671* (2013.01); *F05D 2260/40* (2013.01); *F05D 2260/85* (2013.01)
USPC .............................................. 477/15; 477/30

(58) Field of Classification Search
USPC ....................................................... 477/1–15
See application file for complete search history.

(56) References Cited

U.S. PATENT DOCUMENTS 8,424,280 B2 * 4/2013 Moore et al. ............... 60/39.163
2004/0255590 A1 12/2004 Rago et al.
(Continued)

FOREIGN PATENT DOCUMENTS

| EP | 1 898 073 | 3/2008 |
| WO | 2008 082335 | 7/2008 |
| WO | 2008 082336 | 7/2008 |

OTHER PUBLICATIONS

International Search Report Issued Nov. 16, 2010 in PCT/FR10/51427 Filed Jul. 7, 2010.

*Primary Examiner* — Tisha Lewis
(74) *Attorney, Agent, or Firm* — Oblon, McClelland, Maier & Neustadt, L.L.P.

(57) ABSTRACT

A system and a method for controlling an aircraft engine starter/generator. The system includes an AGB of fixed gear ratio for coupling mechanically to a turbine shaft of the engine to enable the engine to be started, a gearbox having multiple gear ratios mechanically coupled to a gearwheel of the AGB, a starter/generator mechanically coupled to a gearwheel of the gearbox, and a controller to cause the gear ratio of the gearbox to be changed as a function of the mode of operation of the starter/generator.

13 Claims, 3 Drawing Sheets

(56) References Cited

U.S. PATENT DOCUMENTS

| | | |
|---|---|---|
| 2005/0103931 A1 | 5/2005 | Morris et al. |
| 2007/0151258 A1* | 7/2007 | Gaines et al. .................. 60/792 |
| 2008/0047376 A1 | 2/2008 | Venter |
| 2009/0271086 A1 | 10/2009 | Morris et al. |

* cited by examiner

METHOD AND SYSTEM FOR CONTROLLING AIRCRAFT ENGINE STARTER/GENERATOR

BACKGROUND OF THE INVENTION

The present invention relates to the general field of gas turbines, and more particularly to controlling a starter/generator.

The field of application of the invention is that of gas turbines for the engines of airplanes or helicopters, and also for auxiliary power units (APUs).

In a gas turbine, certain pieces of equipment or accessories are driven by a mechanical transmission with mechanical power taken from a turbine shaft. This mechanical transmission, referred to as an accessory gearbox (AGB) comprises a set of gearwheels housed in a casing and mechanically coupled to accessories. The accessories include in particular various pumps for producing hydraulic energy, for feeding fuel, and for lubrication, and also in certain applications one or more electrical starter/generators (S/Gs). The speed of the S/G as determined by the AGB is in particular proportional to the speed of operation of the engine, with the coefficient of proportionality corresponding to the gear ratio of the gear system in the AGB.

When the gas turbine is in operation, the or each S/G operates as an electricity generator and produces a supply voltage that powers one or more electrical energy distribution centers for the aircraft and for its engine(s).

When the gas turbine is not operating or is operating at a slow speed of rotation, an S/G may operate as a starter by being powered by an external source of energy in order to set the gas turbine into operation by rotating the turbine shaft to which the AGB is connected.

Optimal mechanical operating conditions for an S/G are contradictory depending on whether it is operating as a starter or as a generator.

For given mechanical power, when an S/G is operating as a starter, it is desired to give priority to high speeds of rotation so as to minimize the torque on the S/G, while ensuring sufficient torque to enable the engine to start. Without any change in gear ratio, using a ratio that gives priority to high speeds in starter mode gives rise to a large range of speed variation in generator mode, thereby increasing the range of generator frequencies in a manner that is harmful to integrating the S/G in the network of the aircraft. In particular, the upper limit may be unacceptable (greater than the 800 hertz (Hz) that is generally acceptable on certain commercial airplanes).

The gear ratio between the turbine shaft and the S/G is consequently selected so as to provide an acceptable compromise between S/G operation as a starter and as a generator. In certain commercial airplanes, generator mode determines the gear ratio to the detriment of starter mode.

OBJECT AND SUMMARY OF THE INVENTION

A main object of the present invention is thus to mitigate such drawbacks by proposing a system for controlling a starter/generator that makes it possible to give priority to the torque transmitted to the engine while the S/G is operating as a starter, and to have operation at an appropriate speed of rotation while operating as a generator.

This object is achieved by a system for controlling a starter/generator of an aircraft engine, the system comprising:

an AGB of fixed gear ratio for coupling mechanically to a turbine shaft of the engine, enabling the engine to be started;

a gearbox having multiple gear ratios and mechanically coupled to a gearwheel of the AGB;

a starter/generator mechanically coupled to a gearwheel of the gearbox; and means for controlling a change in the gear ratio of the gearbox as a function of the mode of operation of the starter/generator.

The use of a gearbox that is interposed between the AGB of fixed gear ratio and the starter/generator presents the advantage of making it possible to use one gear ratio between the turbine shaft and the starter/generator in starter mode, and another gear ratio in generator mode. In particular, in order to start the turbine, the gear ratio of the gearbox is selected so as to be high in order to give priority to rotary torque between the starter and the turbine shaft. Later on during starting, once the starter/generator is operating in generator mode, the gear ratio of the gearbox is changed in order to switch to a lower ratio so as to adapt to the speeds of rotation for generator operation.

Depending on the dimensioning selected for the starter/generator, the benefit of reducing torque can be achieved either entirely to the advantage of the starting electronics, thus making it possible to reduce the weight of the harnesses and of the electronics itself, or else entirely to the advantage of the starter/generator, thereby making it possible to reduce its size and weight, or else to the advantage both of the starting electronics and of the starter/generator.

Furthermore, in the context of the invention, the instant that is selected for switching the gear ratio of the gearbox may turn out to be particularly advantageous. Thus, the gear ratio of the gearbox may be changed as soon as the starter/generator passes from driving to driven relative to the turbine shaft. During this transition between the two modes of operation of the starter/generator while starting the engine, the shaft of the starter/generator goes from being a driving shaft to being a driven shaft. This transition gives rise to the gearwheels in the AGB being momentarily "unloaded", where such unloading is particularly advantageous for changing gear ratio.

In another embodiment of the invention, the gear ratio of the gearbox may be changed as soon as an electrical command of the starter/generator passes from one mode of operation to the other.

The means for changing the gear ratio of the gearbox may include an electronic unit that controls an actuator device for actuating the gearbox.

Under such circumstances, the electronic unit for controlling the engine is advantageously connected to a sensor for sensing the speed of rotation of the turbine shaft. Furthermore, the gearbox may have parallel gearwheels and the gearbox actuator device may be an electrical, hydraulic, or pneumatic actuator.

In yet another embodiment of the invention, the gear ratio of the gearbox is changed automatically.

The invention also provides an aircraft engine including a starter/generator control system as defined above.

The invention also provides a method of controlling an aircraft engine starter/generator, the engine comprising:

an AGB of fixed gear ratio for coupling mechanically to a turbine shaft of the engine, enabling the engine to be started;

a gearbox having multiple gear ratios and mechanically coupled to a gearwheel of the AGB; and a starter/generator mechanically coupled to a gearwheel of the gearbox;

wherein the method consists in changing the gear ratio of the gearbox as a function of the mode of operation of the starter/generator.

BRIEF DESCRIPTION OF THE DRAWINGS

Other characteristics and advantages of the present invention appear from the following description made with reference to the accompanying drawings that show embodiments having no limiting character. In the figures.

DETAILED DESCRIPTION OF EMBODIMENTS

The method and the system for controlling a starter/generator apply to any type of gas turbine engine fitted to aircraft, such as for example airplanes or helicopters.

Figure 1:
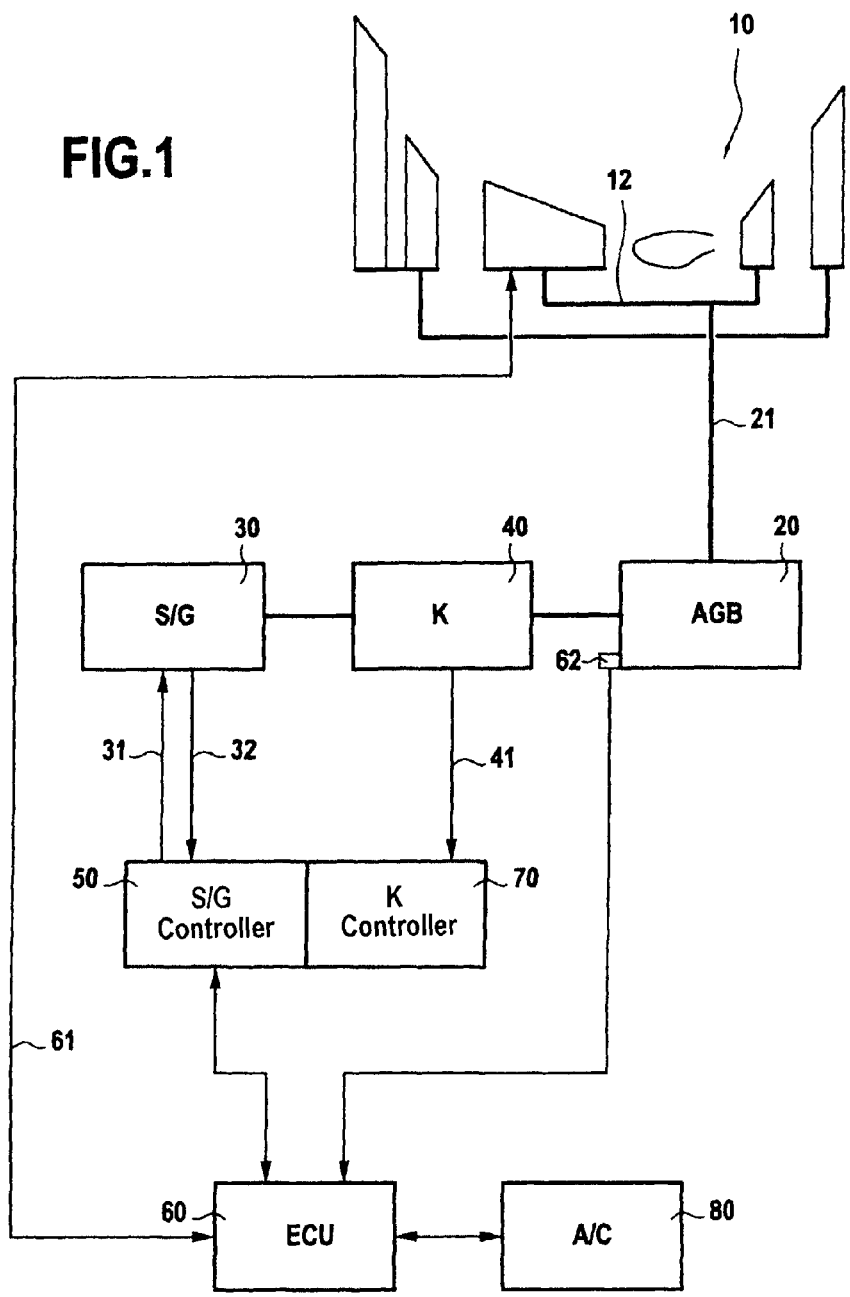
FIG. 1 is a block diagram showing starter/generator control of the invention.

There follows a description with reference to FIG. 1, relating more particularly to a bypass two-spool type turbine engine 10 for an airplane that includes an accessory gearbox 20 used for driving accessories of the turbine or auxiliary equipment, such as various pumps for producing hydraulic energy, delivering fuel, lubrication, etc., and in particular driving a starter/generator (S/G) 30.

In known manner, the AGB 20 has a fixed gear ratio and is made up of a plurality of gearwheels (not shown) that are driven in rotation by a power transmission shaft 21, which shaft is mechanically coupled to a shaft 12 of the turbine so as to enable the turbine to be started (typically the high pressure shaft of the turbine engine).

The S/G 30 and its operation and regulation are of a type that is itself known and they are not described again herein. By way of example, reference may be made to publication FR 2 897 895, which gives a detailed description thereof.

The turbine engine 10 also includes a gearbox (K) 40 having multiple gear ratios that is mechanically coupled to a gearwheel of the AGB 20 that is connected to the shaft 12 of the high pressure turbine of the turbine engine. Embodiments of such a gearbox 40 are described below with reference to FIGS. 3A and 3B.

The starter/generator 30 is mechanically coupled to a gearwheel of the gearbox 40. It is also controlled by a controller 50 that is itself connected to an electronic engine control unit (ECU) 60, the ECU being connected to systems of the airplane that enable it to receive the information needed during starting.

In the embodiment described, the gear ratio of the gearbox is changed as a function of the mode of operation of the starter/generator.

The controller 50 serves in particular (via a line 31) to switch the control mode of the starter/generator in response to an order from the ECU so as to pass to generator mode (it naturally also being possible to control it to pass from generator mode to starter mode). It receives information over a line 32 that is representative of the value of the control current of the starter/generator 30.

In another embodiment (not shown), the command to switch control mode of the starter/generator may be provided in redundant manner, with it being possible to send the control signal directly from the ECU.

The turbine engine 10 also includes a controller 70 for controlling the gearbox 40, which controller is connected to the controller 50. The controller 70 receives information via a line 41 from the gearbox, which information is representative of the value of the gear ratio of the gearbox.

In yet another embodiment (not shown), the controller 50 directly manages the commands sent to the controller 70 of the gearbox 40 (as a function of its dimensioning in generator mode or in starter mode), and it receives its own commands from the airplane without passing via the ECU.

In known manner, the ECU 60 receives various values over a line 61 that are representative of operating parameters of the engine (in particular the speed of rotation of the high pressure shaft 12 of the turbine engine as picked up by a speed sensor 62 mounted on said shaft, the outlet temperature from the turbine, the static pressure in the combustion chamber, etc.), and it controls various members of the engine (actuators, fuel injectors, fuel flow rate, etc.).

The stage of starting the turbine engine 10, and more particularly how the starter/generator is controlled during starting, takes place as follows.

During actuation of the starting command, the ECU that is connected to the systems of the airplane sends an order to the controller 50 of the S/G to modify its exciter so as to go into starter mode, with an order previously being sent to the controller 70 so as to cause the gearbox to adopt a predefined first gear ratio k1, and with the starter being launched. Thereafter, the ECU controls various units of the turbine engine, such as, for example, in succession: ignition of the fuel injectors; injection of fuel; etc.

As soon as the measured speed of the high pressure shaft 12 of the turbine engine becomes greater than or equal to a predefined threshold $S_1$, the ECU sends an order to the controller 50 of the S/G to switch off the starter. Thereafter, as soon as the speed of rotation of the high pressure shaft 12 exceeds a predefined threshold $S_2$, the ECU orders the controller 50 of the S/G to switch to generator mode, the controller 70 controlling the gearbox being caused to switch to a second predefined gear ratio k2 (different from the first gear ratio k1), with the controller 50 of the S/G then being ordered to modify the exciter of the S/G in order to switch to generator mode.

Figure 2:
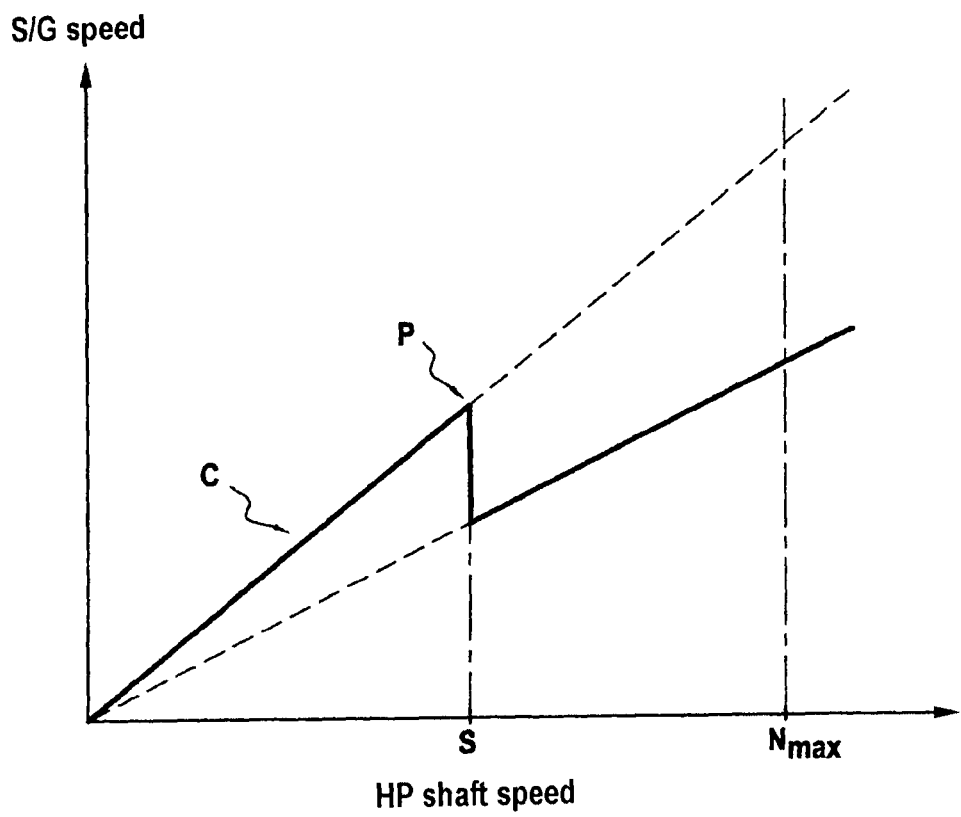
FIG. 2 is a graph showing an example of the speed of rotation of the rotor of a starter/generator controlled in accordance with the invention as a function of the speed of rotation of the associated turbine shaft.

FIG. 2 shows the speed of rotation of the rotor of the above-described starter/generator as a function of the speed of rotation of the high pressure shaft of the turbine engine during operation of the turbine engine.

In this figure, point P of the curve C corresponds to changing the gear ratio of the gearbox from the ratio k1 to the ratio k2. As shown in this figure, this ratio change takes place under control of the gearbox controller 70.

The dashed line curve extending the curve C beyond the point P where the gearbox gear ratio is changed corresponds to the speed of the rotation that the rotor of the starter/generator would have had if the turbine engine did not have a gearbox (with a constant gear ratio, this speed of rotation is proportional to the speed of rotation of the high pressure shaft of the turbine engine). The point $N_{max}$ corresponds to a maximum speed of rotation of the high pressure shaft.

Analyzing the curve C reveals several features of the way the starter/generator is controlled in the invention. Changing the gear ratio enables the starter/generator to operate at a greater speed in starter mode, while still having an appropriate range of speeds in generator mode. In the absence of the device for changing the gear ratio, it would be necessary to find a compromise between the two speed ranges.

Two embodiments of a gearbox for the invention are described below with reference to FIGS. 3A and 3B.

Figure 3A:
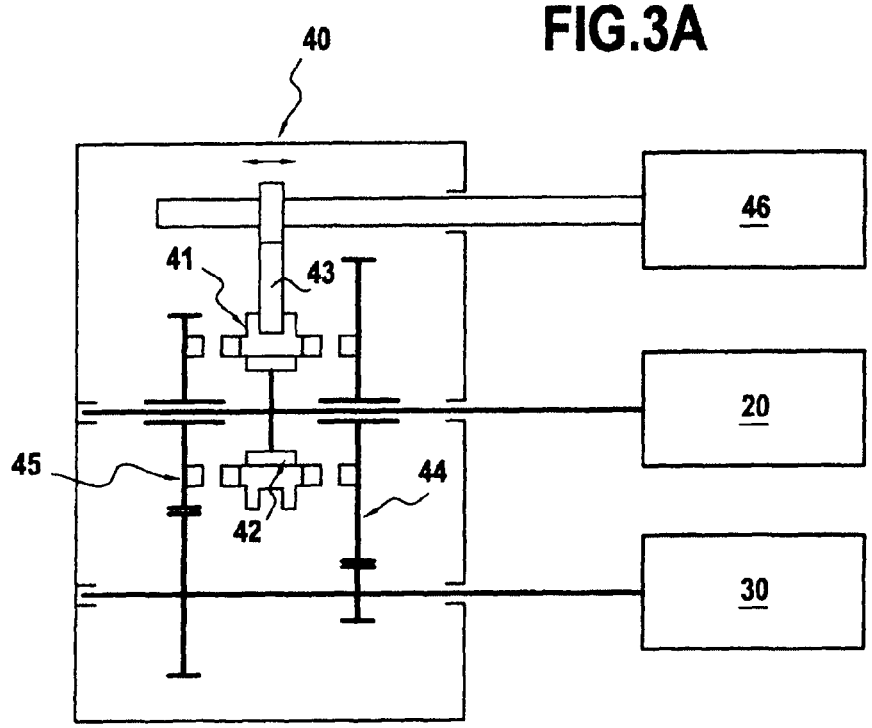
FIGS. 3A and 3B are highly diagrammatic views of two embodiments of a gearbox of the invention.

In the embodiment of FIG. 3A, the gearbox 40 is of conventional type having parallel gears. It comprises in particular a spider coupling 41 and a hub 42 that are both movable by actuating a fork 43. The spider coupling 41 may engage two dog rings 44 and 45 having different numbers of teeth. The rings 44 and 45 are mechanically coupled firstly to a gearwheel of the AGB 20 and secondly to the rotor of the starter/generator 30.

Furthermore, an actuator device 46 is provided to actuate the fork 43 of the gearbox 40, this actuator device possibly being an electric actuator, a hydraulic actuator, or indeed a pneumatic actuator. Whatever the way in which it is implemented, the actuator device 46 is controlled by the controller of the gearbox K.

Figure 3B:
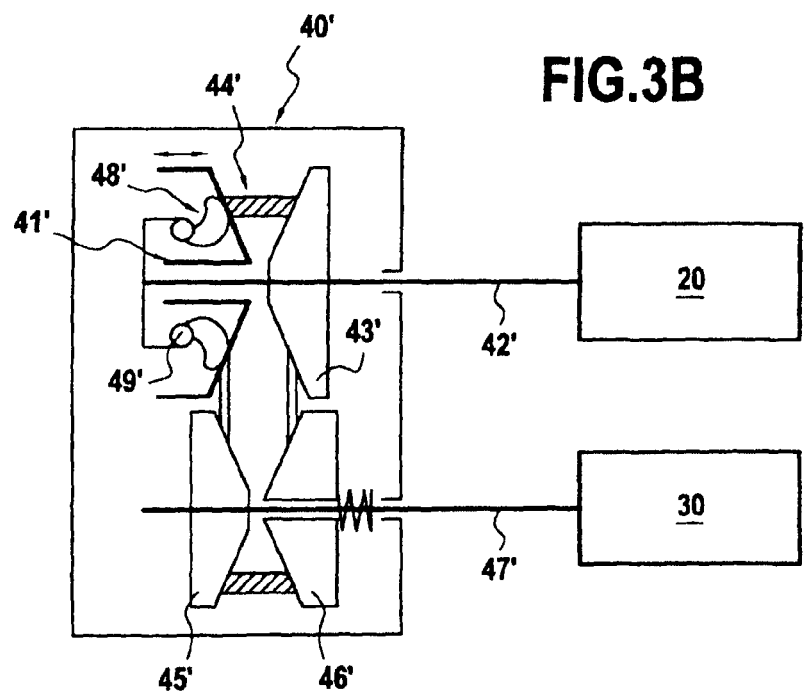

In the embodiment of FIG. 3B, the gearbox 40' is of known type using a belt. In particular, it comprises a first conical disk 41' slidably mounted on the shaft 42' that is mechanically coupled to a gearwheel of the AGB 20. The first conical disk 41' is coupled by friction to a second conical disk 43' that is mechanically coupled to the shaft 42' by a belt 44'. The belt is also coupled to two other conical disks 45' and 46' that are constrained to rotate with a shaft 47' that is mechanically coupled to the rotor of the starter/generator 30. With this type of gearbox, the gear ratio between the shaft 42' and the shaft 47' varies as a function of the distance between the first conical disk 41' and the second conical disk 43'.

Movement of the first conical disk 41' relative to the second conical disk 43' can be driven using an electrical, hydraulic, or pneumatic actuator. Under such circumstances, the actuator is controlled by the controller of the gearbox K.

Alternatively, the first conical disk 41' may be moved relative to the second conical disk 43', thereby changing the gear ratio between the shaft 42' and the shaft 47', in automatic manner. For this purpose, and as shown in FIG. 3B, the shaft 42' coupled mechanically to a gearwheel of the AGB 20 carries flyweights 48' at its free end having the first conical disk 41' resting thereagainst. Depending on the speed of rotation of the shaft 42' (and thus the speed of rotation of the turbine shaft coupled to the AGB), the flyweights can pivot about their respective axes 49' under the effect of the centrifugal force due to their rotation, thereby causing the first conical disk 41' to move along the shaft 42' in one direction or the other, thus changing the gear ratio between the shaft 42' and the shaft 47'.

Whatever the embodiment chosen, the gearbox may be integrated in the starter/generator, in the AGB, or indeed directly in the turbine shaft. Alternatively, it may be removable and positioned between the AGB and the starter/generator.

The invention claimed is:

1. A system for controlling a starter/generator of an aircraft engine, the system comprising:
   an accessory gearbox (AGB) of fixed gear ratio for coupling mechanically to a turbine shaft of the engine, enabling the engine to be started;
   a starter/generator mechanically coupled to the AGB via a gearbox having multiple gear ratios and interposed between the AGB and the starter/generator; and
   means for controlling a change in the gear ratio of the gearbox as a function of the mode of operation of the starter/generator,
   wherein the AGB comprises a set of gearwheels housed in a casing that are driven in rotation by a power transmission shaft which is mechanically coupled to the turbine shaft, the gearwheels being mechanically coupled to accessories including the starter/generator and at least one pump.

2. A system according to claim 1, wherein the means for controlling changes the gear ratio of the gearbox as soon as the starter/generator passes from driving to driven relative to the turbine shaft.

3. A system according to claim 1, wherein the means for controlling changes the gear ratio of the gearbox as soon as an electrical command of the starter/generator passes from one mode of operation to the other.

4. A system according to claim 1, wherein the means for changing the gear ratio of the gearbox include an electronic unit that controls an actuator device for actuating the gearbox.

5. A system according to claim 4, wherein the electronic unit for controlling the actuator device is connected to a sensor for sensing the speed of rotation of the turbine shaft.

6. A system according to claim 4, wherein the gearbox has parallel gearwheels.

7. A system according to claim 4, wherein the gearbox actuator device is an electrical, hydraulic, or pneumatic actuator.

8. A system according to claim 1, wherein the gear ratio of the gearbox is changed automatically.

9. An aircraft engine including a starter/generator control system according to claim 1.

10. A method of controlling an aircraft engine starter/generator, the engine comprising: an accessory gearbox (AGB) of fixed gear ratio for coupling mechanically to a turbine shaft of the engine, enabling the engine to be started; and a starter/generator mechanically coupled to the AGB via a gearbox having multiple gear ratios, which gearbox is interposed between the AGB and the starter/generator, the method comprising:
   changing the gear ratio of the gearbox as a function of the mode of operation of the starter/generator,
   wherein the AGB comprises a set of gearwheels housed in a casing that are driven in rotation by a power transmission shaft which is mechanically coupled to the turbine shaft, the gearwheels being mechanically coupled to accessories including the starter/generator and at least one pump.

11. A system according to claim 1, wherein the means for controlling sets the gear ratio of the gearbox at a first gear ratio, corresponding to starter mode of the starter/generator, when the turbine shaft is below a predetermined value, and sets the gear ratio of the gearbox at a second gear ratio, corresponding to generator mode of the starter/generator, when the turbine shaft is above the predetermined value, the second gear ratio being different than the first gear ratio.

12. A system according to claim 1, wherein the gearbox comprises a spider coupling and a hub that are both movable by actuating a fork, the spider coupling engaging first and second dog rings having different numbers of teeth, the rings being mechanically coupled to a gearwheel of the AGB and to a rotor of the starter/generator.

13. A system according to claim 1, wherein the gearbox comprises a first conical disk slidably mounted on a first shaft which is mechanically coupled to a gearwheel of the AGB, a second conical disk coupled by friction to the first conical disk and is coupled to the first shaft by a belt, a third conical disk slidably mounted on a second shaft which is mechanically coupled to a rotor of the starter/generator, and a fourth conical disk which is coupled to the third conical disk and is coupled to the second shaft by the belt,
   wherein the gear ratio between the first and second shafts varies as a function of a distance between the first and second conical disks.

* * * * *